Figure 1:
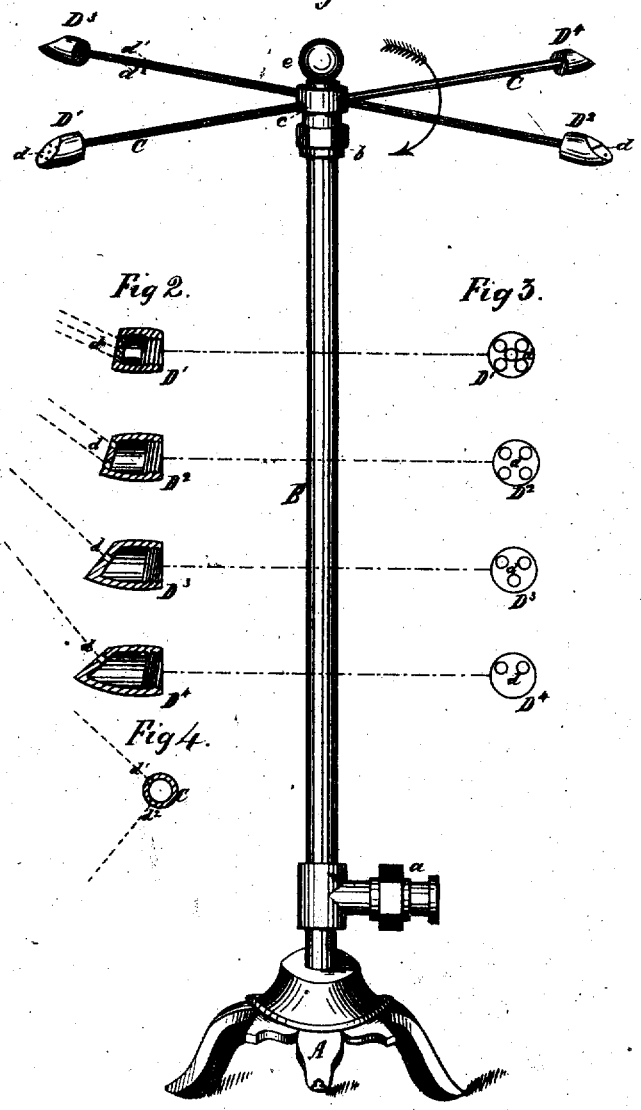

R. BRUSIE.

Portable Fountain and Lawn Sprinkler.

No. 6,560. Reissued July 27, 1875.

Witnesses.

Wm Edwards

Elbert F. Hendrew

Inventor.

Russell Brusie per Samuel Whitney

Atty.

LEGIBLE COPY

UNITED STATES PATENT OFFICE.

RUSSELL BRUSIE, OF NEW YORK, N. Y.

IMPROVEMENT IN PORTABLE FOUNTAINS AND LAWN-SPRINKLERS.

Specification forming part of Letters Patent No. 137,175, dated March 25, 1873; reissue No. 6,560, dated July 27, 1875; application filed July 2, 1875.

*To all whom it may concern:*

Be it known that I, RUSSELL BRUSIE, of the city, county, and State of New York, have invented an Improved Portable Fountain and Lawn-Sprinkler, of which the following is a full and exact description:

My invention relates to that class of fountains in which the water is ejected from rotary arms; and its object is to provide an apparatus of this class which will be portable and capable of distributing the water therefrom with such conformity as to fit the apparatus for sprinkling or watering lawns, grass plats, &c. To this end my invention consists in the construction of the radial arms of the fountain with foraminated caps or bulbs, whereby the water is thrown beyond the area traversed simply by the arms, and thereby caused to sprinkle a much larger area than would be possible if the water issued only from the sides of the arms, as in the fountains hitherto made on the rotary or "Barker mill" principle.

My invention further consists in an improved arrangement of the orifices in the rotating arms, from which the water is discharged, whereby a much larger space can be sprinkled; and, also, in a device for counteracting the friction on the journals of the revolving parts of the fountain.

In the drawing, Figure 1 is a perspective view of my improved fountain and lawn-sprinkler. Fig. 2 is a sectional view of Fig. 3, of the perforated cap on the ends of the radial arms C of Fig. 1. Fig. 3 is a plan view of the outer ends of said caps, showing the varying number and arrangement of the orifices *d* in the same; and Fig. 4 is a transverse section of one of the arms C, Fig. 1, showing the double row of perforations on the same at angles oppositely inclined.

As represented in the drawing, A is the base of the apparatus, which may be of any ornamental design, the feet of which are preferably furnished with spikes or spurs for inserting in the ground to retain the fountain in position. B is the vertical tubular standard of the fountain, having a shoulder at *b*, and a coupling, *a*, at its lower part, for connecting it with a flexible hose attached to the water-supply. The arms C radiate from and open into the hollow ring *c*, which ring rests on the conical truncated top of the standard B, their surfaces corresponding with each other, and ground to prevent the escape of water at that part. On the outer ends of the arms are secured perforated caps $D^1$ $D^2$ $D^3$ $D^4$, (shown in section in Fig. 2 and in plan in Fig. 3,) the perforations or orifices in which vary in number from two to five, and in their angles of inclination from ten to sixty degrees, or thereabout, as shown. The ball *e*, or any other suitable or ornamental device, is screwed on the top of the standard, and serves to retain the ring *c* in place and close the tubular standard, so that all the water is distributed laterally.

The water finds access to the ring *c* from the tubular standard B, through a series of perforations in its conical truncated top. From the ring *c* the water enters the arms C, and from thence is discharged through the variously-inclined perforations on their sides and ends. The arms revolve by the reaction of the water on its escape therefrom on the well-known principle of the reaction-wheel. The reaction of the water issuing from the downwardly-inclined perforations $d^2$ on the sides of the arms C (best seen in Fig. 4) tends to raise as well as revolve the same, and thus partly counteract their weight, and the consequent friction of the ring *c*.

The water issuing from the sides of the arms sprinkles a circle around the base of the fountain, while that issuing from the perforated caps on the ends of the arms is thrown in concentric circles, one arm throwing beyond the other, according to the inclination of its perforations, those perforations least inclined to the perpendicular throwing the water farthest from the center, and vice versa.

It will be seen upon reference to Figs. 2 and 3 that the orifices which are least inclined to the perpendicular are of the greatest number, as $D^1$, Figs. 2 and 3, while those which are most inclined are of the smallest number, as $D^4$. The reason for this is obvious, as the arm having the least-inclined perforations throws the farthest from the center, has an annular space of greater radius and surface to sprinkle, and necessarily requires a greater quantity of water to effect the purpose, and vice versa.

With the orifices thus arranged a large space may be sprinkled by a very moderately-sized apparatus.

I do not confine myself to any specific arrangement of the orifices, either as to their number, or their angles of inclination, as various arrangements of both may be used to advantage.

What I claim as my invention is—

1. The combination of the foraminated caps $D^1$ $D^2$, &c., with the radial arms of a portable rotary fountain or sprinkler, substantially as and for the purpose set forth.

2. In a revolving lawn-sprinkler, a series of discharge-orifices, having an inclination varying with its different arms, and of variable number, substantially as shown and described.

RUSSELL BRUSIE.

Witnesses:

JAMES A. WHITNEY,
W. M. EDWARD.